United States Patent

[11] 3,580,504

| [72] | Inventor | Ralph E. Benham |
| | | Arcadia, Calif. |
| [21] | Appl. No. | 793,669 |
| [22] | Filed | Jan. 24, 1969 |
| [45] | Patented | May 25, 1971 |
| [73] | Assignee | Purex Corporation, Ltd. |
| | | Lakewood, Calif. |

[54] IRRIGATION CONTROL APPARATUS
9 Claims, 3 Drawing Figs.

[52] U.S. Cl. .................................................. 239/70,
251/137, 317/148.5, 307/38
[51] Int. Cl. ................................................ A01g 27/00
[50] Field of Search ........................................... 239/70;
251/137; 317/148.5; 307/38

[56] References Cited
UNITED STATES PATENTS

| 1,739,787 | 12/1929 | Doughty et al. .............. | 239/70X |
| 3,063,643 | 11/1962 | Roberts ......................... | 239/70 |
| 3,118,606 | 1/1964 | Rotunda ........................ | 239/70X |
| 3,412,971 | 11/1968 | McDivitt ...................... | 317/148.5UX |
| 3,488,000 | 1/1970 | Cramer ......................... | 239/70X |

*Primary Examiner*—M. Henson Wood, Jr.
*Assistant Examiner*—Michael Y. Mar
*Attorney*—White & Haefliger ABSTRACT: Automatic, remote operation of irrigation systems is provided without the use of central power facilities by controlling periodic water delivery to the irrigating heads through the use of battery charged capacitors to sequentially operate an electrically responsive valve actuator to open and close a valve in a predetermined time relation.

PATENTED MAY 25 1971

3,580,504

INVENTOR.
RALPH E. BENHAM
By White & Haefliger
ATTORNEYS.

IRRIGATION CONTROL APPARATUS

BACKGROUND OF THE INVENTION

1. Field of the Invention

This invention is concerned with irrigation, specifically the controlled irrigating of land areas which may be remote to central power supply networks. In rural areas, and urban areas too, the expense of extending power lines throughout extensive land holdings has curtailed the adoption of automatic irrigating practices. Despite the labor costs it has been found less expensive to install hand-operated valves on remotely located systems which are dutifully hand operated by a worker on a daily or weekly basis. Increasing labor rates have made this practice less desirable, but the initial cost of electrification has been prohibitive. In dry areas, such as the southwest United States, proper irrigation is important to crop growth and land maintenance against erosion and brush fires.

2. Prior Art

Electrically operated valves, adaptable to, and even designed for irrigation systems are known. These valves have employed a solenoid valve actuator. In the past the current requirement to open and hold open the solenoid actuated valve for the irrigating period e.g. one-half hour every 24 hours has been such as to make only a central power supply feasible. Battery operated solenoids quickly exhaust the battery during the open valve period.

SUMMARY OF THE INVENTION

It has now been found that a reliable, long term operable irrigation system utilizing a battery can be produced. This is an irrigation system having a water supply and one or more irrigating heads connected thereto; self-contained control means are provided for controlling water delivery to the heads. This control means includes a valve and an electrically responsive valve actuator. The control circuit comprises a battery, capacitive means for storing charge from the battery and relay means through which the capacitive means and the valve actuator are connectable to operate the valve. Timing means are provided for closing the relay means in a predetermined time relation.

The water supply pipe on which the valve is positioned upstream of the heads may also serve to support the control means serviced thereto and spaced therealong from the valve.

The timing means may include a member moveable relative to the relay means which carries magnets in spaced relation for timed relative movement to the relay means.

In a particularly advantageous control circuit arrangement, a silicon controlled rectifier (SCR) is provided for electrically connecting the actuating capacitor and the solenoid coil. A trigger circuit for the SCR is provided including a trigger capacitor for storing a trigger charge from the battery and trigger relays for connecting the trigger capacitor and SCR, through operation of a timing means including trigger relay actuating means having time related movement. A pair of SCR's may be used to respectively open and close the valve by corresponding actuation of the valve actuator. Correspondingly, two trigger relays are provided, each connected to one of the SCR's and two independently operable trigger relay actuators which are moveable relative to the trigger relays in a predetermined time sequence to thereby define relative open and closed periods of the valve. A clock mechanism may be used to drive permanent magnets as the relay actuating means. Conveniently, a rotatable dial is provided having time related subdivisions on which the relay actuation magnets are positionable in various relative arrangements to be moveable therewith and relative to the trigger relay means.

The valve actuator is suitably of the "reversing magnet solenoid" type whereby retention of the valve open or valve closed positions by the core is possible without continuing application of current to the surrounding coil of the solenoid device.

DESCRIPTION OF THE PREFERRED EMBODIMENTS

Figure 1:
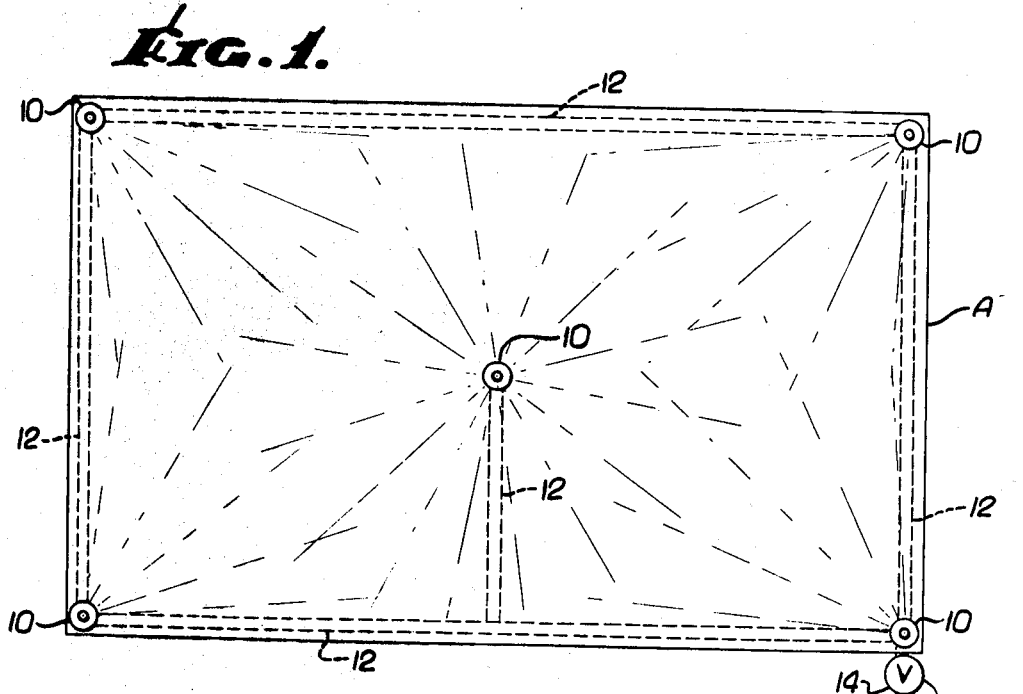
FIG. 1 is a diagrammatic view of an irrigation setup showing the valve and control device therefor.

In the drawings, FIG. 1 depicts a land area A having plural irrigating heads 10 connected together by underground conduit 12. The heads 10 are of conventional design having variously shaped orifices to project water outwardly in a spray pattern defined in shape by the orifice construction and in size by the pressure of the water in conduit 12. The area A is representative of any ground which it is desirable to irrigate e.g. highway border strips, hillsides, crop lands et cetera.

A valve 14 is provided controlling water flow into conduit 12 from water supply pipe 16 which is connected to a water supply (not shown). The mechanism of valve 14 is not particularly critical, the only requirement being the ability to reliably open and close communication between supply pipe 16 and conduit 12 in response to electrical impulse. A diaphragm valve of conventional construction in which open and closed positions of the valve are defined by alternative locations of a diaphragm which is moved between positions by a moveable solenoid core is preferred as the valve structure.

Movement of the valve between open and closed positions is controlled by a control device 18 mounted on the supply pipe 16 with bracket 18a and spaced along the pipe relative to the valve 14 and electrically connected thereto by wire 20. Current delivered to valve 14 actuates the valve actuator e.g. a solenoid core (not shown) to correspondingly open and close the valve. In preferred practice the valve actuator is a reversing magnetic solenoid. This device utilizes a pair of magnets, one surrounded by a coil and switchable in its flux direction by appropriate current direction in the coil and the other permanent. Between the magnets a two piece plunger operates to close the valve when the magnetic flux fields of the permanent magnet and switchable magnet are opposed and to open the valve when the magnetic flux fields of both magnets are aiding. The device is available from Skinner Electric Valve Division, Skinner Precision Industries, New Britain, Connecticut It is a feature of the device that once the plunger is closed or open i.e. in either position, no current is required to maintain that condition and a short (20 msec.) current flow will reverse the switchable element polarity and thus the position of the plunger.

The plunger of a solenoid such as just described is utilized herein to drive the valve element to open and shut the valve.

Figure 3:
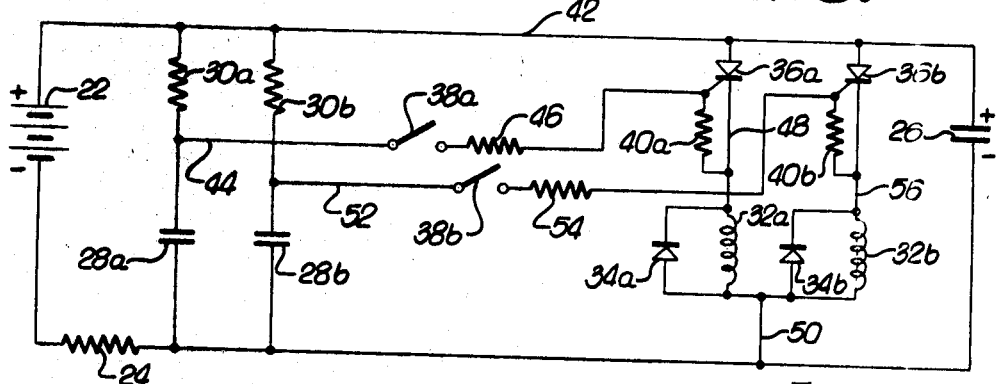
FIG. 3 is a schematic of the circuit utilized in the control device.

Current to control movement of the plunger is provided typically through a circuit such as shown in FIG. 3. As depicted there a battery 22 with dropping resistor 24 is connected in charging relation with an actuating capacitor 26 and with two trigger circuit capacitors 28a and 28b which are respectively connected in series with load resistors 30a and 30b. The valve actuating coils 32a and 32b with their reference voltage diodes 34a and 34b are connected across actuating capacitor 26 via a pair of SCR's 36a and 36b as shown. The SCR gates are in series, respectively, with trigger circuit capacitors 28a and 28b and via reed switches 38a and 38b. Load resistors 40a and 40b are connected as shown.

Figure 2:
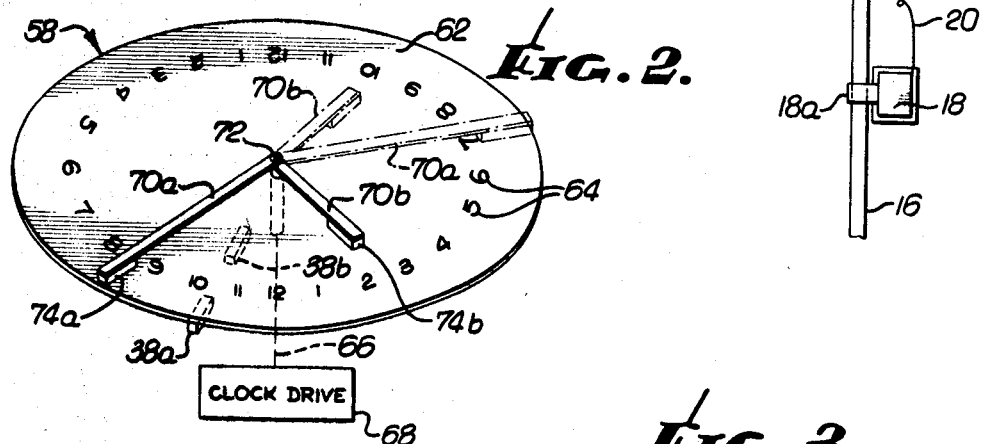
FIG. 2 is a diagrammatic view of the control switch operation feature of the invention.

In operation capacitor 26 is charged along line 42 by the battery 22. Capacitors 28a and 28b are similarly charged. Magnetic reed switch 38a (SPST-NO) is closed by a magnet in a manner to be described (FIG. 2). Stored charge from capacitor 28a flows along line 44 through resistor 46 to SCR 36a. This current triggers the SCR to close the circuit between capacitor 26 and coil 32a along lines 48, 50. The plunger of the reversing magnet solenoid (not shown) is operated to actuate the valve 14 to an open position.

After a predetermined period, reed switch 38b is closed by magnetic force and current flows through line 52 and resistor 54 to SCR 36b which is thereby triggered to flow current from capacitor 26 through line 56 to reverse the polarity in the reversing magnet solenoid and thus actuate the valve 14 to a closed position. Following opening and closing operation of the valve, the capacitors are recharged from the battery.

It will be noted that current drain on the battery is minimal since no large current demands are placed thereon. For example, a 22 1/2-volt battery in the just described circuit connected to a 4000 microfarad actuating capacitor 26 will operate the valve, providing a current of 20 amps through the SCR's after a trigger current of 0.1 amp from the trigger capacitors. Other typical values in the circuit include a 22K dropping resistor 24, 150K resistors 30a and 30b in series with the trigger capacitors 28a and 28b, 390 ohm resistors 46 and 54 in series with the reed switches, and 1K resistors 40a and 40b.

With reference now to FIG. 2 of the drawing, an arrangement of elements for providing appropriately timed closure of the reed switches 38a, b is shown. There is provided a timing device 58 suitably in the form of a dial 62 subdivided into appropriate chronological increments 64 e.g. 24 intervals with e.g. day-night designation. The dial 62 is rotatably driven on a shaft 66 by a battery powered clock mechanism indicated at 68.

Indicator arms 70a and 70b are provided on the dial 62. The arms 70a and 70b are adjustable by pivoting about shaft 66 to provide greater or less angular distance between the arms. Set screw 72 fixes the arms 70a and 70b in the selected position e.g. as shown or as in the dotted outline.

Reed switches 38a and 38b are positioned as shown. Permanent magnets 74a and 74b are fixed to the arms 70a and 70b in a manner such that they will pass in close proximity to switches 38a and 38b respectively when carried angularly on dial 62. In operation the arm 70a is set on the dial 62 to initiate irrigation at a desired time e.g. 5 a.m. Arm 70b is set on dial 62 to terminate such irrigation after a suitable period e.g. 30 minutes. With the arms 70a and 70b, hence magnets 74a and 74b thus angularly spaced, movement of the dial, by the clock mechanism 68 carries the magnet 74a to the reed switch 38a. In passing the switch 38a the magnetic field surrounding the magnet 74a closes the switch, energizing the SCR and actuating the valve actuator as above described. Thereafter arm 70b carrying magnet 74b approaches reed switch 38b with the continued revolution of dial 62. Switch 38b closes triggering reversal of the valve. The arms 70a and 70b then travel around for another cycle during which battery 22 again builds charge in the several capacitors.

I claim:

1. In an irrigation system having a water supply and one or more irrigating heads connected thereto, self-contained control means for controlling water delivery to said heads, said means including a valve and an electrically responsive valve actuator, and a control circuit therefor, said circuit comprising a battery, capacitive means for storing charge from the battery and relay means including an SCR through which said capacitive means and said valve actuator are connectable to operate the valve, and timing means including a battery operated clock mechanism for operating said relay means in a predetermined time relation.

2. Irrigation system according to claim 1 including also a water supply pipe and in which said control means are secured to said pipe in spaced relation to said valve.

3. Irrigation system according to claim 1 in which said timing means further includes a member moveable by said clock mechanism relative to said relay means and magnet means carried by said member for timed movement to said relay means.

4. In an irrigation system having a water supply and one or more irrigating heads connected thereto, self contained control means for controlling water delivery to said heads, said means including a valve and an electrically responsive valve actuator, and a control circuit therefor, said circuit comprising a battery, a capacitor for storing charge from the battery and an SCR through which the capacitor and valve actuator are connectable to operate the valve, and timing means for actuating the SCR in predetermined time relation including a battery operated clock.

5. Irrigation system according to claim 4 including also a trigger circuit for said SCR, said trigger circuit including a capacitor for storing charge from said battery and trigger relay means for connecting said capacitor and SCR, and in which said timing means comprises trigger relay actuating means having time related movement.

6. Irrigation system according to claim 5 including also a pair of SCR's to respectively open and close said valve by corresponding actuation of the valve actuator, a pair of trigger relay means each connected to one of said SCR's, and pair of trigger actuating means moveable relative to said trigger relay means in predetermined time sequence to thereby define the relative opened and closed periods of said valve.

7. Irrigation system according to claim 6 in which said trigger relay actuating means are permanent magnets and are carried angularly about a central axis toward and away from said trigger relays and including also a clock mechanism to drive said magnets.

8. Irrigation system according to claim 7 in which said valve actuator is a reversing magnet solenoid.

9. Irrigation system according to claim 8 in which said timing device includes a rotatable dial having time-related subdivisions and in which said trigger relay actuating means are positionable relative to one another on said dial and are movable therewith and relative to said trigger relay means.